(12) United States Patent
Aronsson et al.

(10) Patent No.: US 11,022,055 B2
(45) Date of Patent: Jun. 1, 2021

(54) INTERNAL COMBUSTION ENGINE SYSTEM FOR EXHAUST GAS RECOVERY

(71) Applicant: VOLVO TRUCK CORPORATION, Gothenburg (SE)

(72) Inventors: Ulf Aronsson, Lund (SE); Martin Bauer, Anderslov (SE); Mohammed Adlouni, Eslöv (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 78 days.

(21) Appl. No.: 15/738,640

(22) PCT Filed: Jun. 20, 2016

(86) PCT No.: PCT/EP2016/064196
§ 371 (c)(1),
(2) Date: Dec. 21, 2017

(87) PCT Pub. No.: WO2016/207112
PCT Pub. Date: Dec. 29, 2016

(65) Prior Publication Data
US 2018/0171903 A1    Jun. 21, 2018

(30) Foreign Application Priority Data

Jun. 23, 2015 (WO) ................ PCT/EP2015/064080

(51) Int. Cl.
*F02M 26/05* (2016.01)
*F02M 26/08* (2016.01)
(Continued)

(52) U.S. Cl.
CPC ......... *F02D 41/0065* (2013.01); *F01N 3/021* (2013.01); *F01N 3/2066* (2013.01);
(Continued)

(58) Field of Classification Search
CPC ........ F02M 26/05; F02M 26/07; F02M 26/08; F02M 26/16; F02M 26/38; F02M 26/42;
(Continued)

(56) References Cited

U.S. PATENT DOCUMENTS 6,085,524 A * 7/2000 Persson ................ F02B 37/005
                                                    123/323
10,054,083 B2 * 8/2018 Selway .................. F02M 26/53
(Continued)

FOREIGN PATENT DOCUMENTS

CN         102345535 A      2/2012
DE      102004021386 A1    11/2005
(Continued)

OTHER PUBLICATIONS

EP-1396619-A1 Hoecker, Published Mar. 2004, English Translation (Year: 2004).*
(Continued)

*Primary Examiner* — Laert Dounis
(74) *Attorney, Agent, or Firm* — Venable LLP; Jeffri A. Kaminski

(57) ABSTRACT

An internal combustion engine system includes an internal combustion engine, a first turbine unit receiving exhaust gases from the internal combustion engine, the turbine unit having a compressor for compressing intake air and feeding the intake air by an air intake line to the internal combustion engine, and an exhaust gas recirculation line connecting the air intake line with an exhaust as line of the internal combustion engine at a position upstream the first turbine unit. A bypass line connects the exhaust gas recirculation line to the exhaust gas line at a position downstream of the turbine unit, the bypass line having an arrangement for controlling the exhaust gas flow from the exhaust gas recirculation line to the exhaust gas line.

15 Claims, 8 Drawing Sheets

(51) Int. Cl.
  *F02M 26/09* (2016.01)
  *F02B 37/18* (2006.01)
  *F02B 37/013* (2006.01)
  *F02B 37/02* (2006.01)
  *F02B 37/00* (2006.01)
  *F02M 26/42* (2016.01)
  *F02M 26/38* (2016.01)
  *F02D 41/00* (2006.01)
  *F02B 41/10* (2006.01)
  *F02M 26/16* (2016.01)
  *F01N 3/021* (2006.01)
  *F01N 3/20* (2006.01)

(52) U.S. Cl.
  CPC .......... *F02B 37/004* (2013.01); *F02B 37/013* (2013.01); *F02B 37/025* (2013.01); *F02B 37/18* (2013.01); *F02B 37/183* (2013.01); *F02B 41/10* (2013.01); *F02M 26/05* (2016.02); *F02M 26/08* (2016.02); *F02M 26/09* (2016.02); *F02M 26/16* (2016.02); *F02M 26/38* (2016.02); *F02M 26/42* (2016.02); *F02D 41/0007* (2013.01); *Y02T 10/12* (2013.01); *Y02T 10/40* (2013.01)

(58) Field of Classification Search
  CPC ... F02M 26/44; F02B 37/0013; F02B 37/025; F02B 37/04; F02B 37/10; F02B 37/183; F02B 37/186; F02B 37/004; F02B 37/18–186; F01N 13/107
  See application file for complete search history.

(56) References Cited

U.S. PATENT DOCUMENTS

| | | | | |
|---|---|---|---|---|
| 2004/0112054 | A1* | 6/2004 | Larsson | F01D 11/06 60/611 |
| 2006/0156724 | A1* | 7/2006 | Dismon | F02M 26/35 60/605.2 |
| 2007/0266999 | A1 | 11/2007 | Clarke | |
| 2008/0000226 | A1* | 1/2008 | Arndt | F01N 3/023 60/599 |
| 2010/0037855 | A1* | 2/2010 | French | F02B 37/00 123/323 |
| 2010/0211292 | A1* | 8/2010 | Geyer | F02M 26/39 701/108 |
| 2011/0167816 | A1 | 7/2011 | Ulrey et al. | |
| 2013/0186086 | A1 | 7/2013 | Sarby | |
| 2014/0216030 | A1 | 8/2014 | Cockle et al. | |
| 2015/0260128 | A1* | 9/2015 | Roth | F02M 26/43 123/568.13 |
| 2015/0292345 | A1* | 10/2015 | Giselmo | F01D 11/04 415/111 |
| 2015/0369120 | A1* | 12/2015 | Hodebourg | F16K 11/04 123/568.11 |
| 2016/0097320 | A1* | 4/2016 | Ohrem | F02M 26/05 60/599 |
| 2016/0348615 | A1* | 12/2016 | Fischer | F02M 26/05 |
| 2018/0202396 | A1* | 7/2018 | Zhang | F02M 26/47 |

FOREIGN PATENT DOCUMENTS

| | | | | |
|---|---|---|---|---|
| DE | 102006047858 | A1 | 4/2008 | |
| DE | 102009014277 | A1 * | 9/2010 | ............ F01N 3/021 |
| DE | 102012207266 | A1 * | 11/2013 | ............ F02B 37/18 |
| EP | 1396619 | A1 * | 3/2004 | ............ F02B 37/18 |
| EP | 1405995 | A1 | 4/2004 | |
| EP | 1405995 | A1 * | 4/2004 | ............ F02M 26/44 |
| FR | 3014951 | A1 | 6/2015 | |
| JP | 63189664 | A * | 8/1988 | ............ F02M 26/35 |
| JP | 07259654 | A * | 10/1995 | ............ F02M 26/39 |
| JP | 11082184 | A * | 3/1999 | ............ F02M 26/05 |
| JP | H11324821 | | 11/1999 | |
| JP | 20011407111 | A | 5/2001 | |
| JP | 2005054710 | A * | 3/2005 | ............ F01N 13/107 |
| JP | 2005320940 | | 11/2005 | |
| JP | 2005320940 | A * | 11/2005 | ............ F02M 26/36 |
| JP | 2015055206 | A | 3/2015 | |
| WO | WO-2012110217 | A1 * | 8/2012 | ............ F02B 41/10 |
| WO | 2013163054 | A1 | 10/2013 | |
| WO | 2014177672 | A1 | 11/2014 | |
| WO | WO-2019166528 | A1 * | 9/2019 | ............ F02B 37/18 |

OTHER PUBLICATIONS

JP-2005320940-A Nakatani, Published Nov. 2005, English Translation (Year: 2005).*
DE-102009014277-A1—Petters, Published Sep. 2010, English Translation (Year: 2010).*
JP-2005054710-A—Nakamura, Published Mar. 2005, English Translation (Year: 2005).*
EP-1405995-A1 Backes Rolf Pub Apr. 2004 (Year: 2004).*
International Search Report (dated Sep. 12, 2016) for corresponding International App. PCT/EP2016/064196.
Chinese Office Action dated May 21, 2020 in corresponding Chinese Application No. 201680036466.4, 22 pages.

* cited by examiner

INTERNAL COMBUSTION ENGINE SYSTEM FOR EXHAUST GAS RECOVERY

BACKGROUND AND SUMMARY

The invention relates to an internal combustion engine system, as well as to a method for such internal combustion engine system. In particular, the present invention relates to systems allowing for exhaust gas recovery.

The invention can be applied in heavy-duty vehicles, such as trucks, buses and construction equipment. Although the invention will be described with respect to a truck, the invention is not restricted to this particular vehicle, but may also be used in other applications such as aero or marine systems.

Internal combustion engines may be configured to recirculate some of the exhaust gases in order to reduce emissions of nitrogen oxide ($NO_x$). As the $NO_x$ formation increase at higher temperature, mixing incoming air with exhaust gas will increase the heat capacity of the fuel gas mixture at a given equivalence ratio thus reducing the temperature during the combustion. As a result, the amount of $NO_x$ will decrease.

The $NO_x$ is preferably converted to non-hazardous substances using a catalytic reaction. Such catalytic reactions, made available by an aftertreatment system, are highly dependent on the temperature of the exhaust gases. In particular, a certain temperature threshold should be exceeded for obtaining a desired $NO_x$ reduction.

Internal combustion engines, such as diesel engines, are often equipped with a turbine unit for pressurizing the intake air. US2013186086 describes an internal combustion engine system having an urea injection between a turbocharger and a turbocompound. A reduction of the temperature of the exhaust gas will occur when the exhaust gas expands through the turbocharger, when the urea solution is vaporized, and when the exhaust gas expands through the turbocompound. For increasing the temperature of the exhaust gases downstream the turbocompound, US2013186086 suggests arranging a wastegate bypassing the turbocharger, and a further bypass of the turbocompound.

The system of US2013186086 thus requires one valve for bypassing the turbocharger and one valve for bypassing the turbocompound. Individual control of these valves is consequently required, as well as control of the urea injection between the turbocharger and the turbocompound.

A more simple internal combustion engine system would be desirable.

It is desirable to provide an internal combustion engine system overcoming the above mentioned drawbacks of prior art systems.

By the provision of a bypass line connecting an exhaust gas recirculation line to an exhaust gas line at a position downstream of a turbine unit, and that said bypass line having means for controlling the exhaust gas flow from the exhaust gas recirculation line to the exhaust gas line, a single valve is required. Further, it is possible to maintain a sufficiently high temperature of the exhaust gas upstream the aftertreatment system of the engine, while still providing high engine efficiency also at low engine loads.

An internal combustion engine system is therefore provided. The system comprises an internal combustion engine, and a first turbine unit receiving exhaust gases from the internal combustion engine. The turbine unit has a compressor for compressing intake air and feeding said intake air by means of an air intake line to said internal combustion engine, and the system further comprises an exhaust gas recirculation line connecting said air intake line with an exhaust gas line of the internal combustion engine at a position upstream the first turbine unit. A bypass line connects the exhaust gas recirculation line to the exhaust gas line at a position downstream of the turbine unit, said bypass line having means for controlling the exhaust gas flow from the exhaust gas recirculation line to the exhaust gas line.

According to one embodiment, the means for controlling the exhaust gas flow from the exhaust gas recirculation line to the exhaust gas line is a valve. Accurate control of the bypass flow, and hence, the exhaust gas temperature, may thus be achieved.

According to an embodiment, the internal combustion engine system further comprises a controller configured to control the operation of said valve depending on the internal combustion engine load, internal combustion engine speed, turbine speed, and/or the lambda value of the internal combustion engine. An advantage is thus that the exhaust gas temperature may be controlled in an intelligent manner, providing improved aftertreatment of the exhaust gas without reducing engine efficiency.

According to an embodiment, at least one valve is provided in said exhaust gas recirculation line. Hence it is possible to control also the amount of exhaust gas being recirculated to the air intake.

The bypass line may be connected to the exhaust gas recirculation line at a position located downstream said at least one valve.

In an embodiment the bypass line is connected to the exhaust gas recirculation line at a position located between said at least one valve and the position where the exhaust gas recirculation line branches with the air intake line.

According to an embodiment, the exhaust gas line comprises a first branch allowing exhaust gas to flow from a first set of cylinders to the first turbine unit, and a second branch allowing exhaust gas to flow from a second set of cylinders to the first turbine unit. At least one valve is provided in each one of said branches. Individual exhaust gas recirculation for the different sets of cylinders is thus achieved.

According to an embodiment, the first turbine unit is a turbocharger unit. Hence the internal combustion engine system may be used for heavy vehicles, normally being equipped with turbochargers. Also, the internal combustion engine system may be controlled to decrease the turbine speed, as well as to match the flow capacity of the turbocharger turbine at low engine loads with maintained maximum achievable engine torque output.

According to an embodiment, the internal combustion engine system further comprises a second turbine unit arranged downstream the first turbine unit such that the second turbine unit receives exhaust gas flowing out from the first turbine unit, wherein said bypass line is connecting the exhaust gas recirculation line to the exhaust gas line, at a position downstream of the second turbine unit. According to an embodiment, the second turbine unit is a turbocharger unit. According to an embodiment, the second turbine unit is a turbocompound unit. By bypassing the second turbine unit, additional decrease of exhaust gas temperature is prevented.

According to an embodiment, the bypass line is connecting the exhaust gas recirculation line to an exhaust gas collector of the turbocompound unit. The exhaust gas collector may be in fluid communication with a buffer gas duct which leads into the exhaust gas collector, whereby the buffer gas duct is arranged to supply exhaust gas from the exhaust collector to a sealing arrangement positioned in the vicinity of a turbine wheel of the turbocompound unit for preventing oil from escaping from an associated bearing housing to a diffuser duct of the turbocompound unit. It is thus possible to maintain a positive air flow into the bearing housing during the entire operation cycle.

In an embodiment, the exhaust gas collector forms an annular flow path for the exhaust gases. Hence, it allows a part of the buffer gas duct to be formed at a specific angular position relative the exhaust outlet. The angular position may thus correspond to the angular position at which the exhaust gas pressure is at its maximum.

According to an embodiment, the buffer gas duct extends from a buffer gas inlet arranged at the outer periphery of the exhaust collector. Hence the gas inlet is in fluid communication with the volume inside the exhaust collector and the buffer gas duct may be constructed to extend from the gas inlet without interfering with the volume inside the exhaust collector.

According to an embodiment, the buffer gas inlet is arranged at a circumferential position of 170°-190° measured from the circumferential position of a center of an exhaust outlet of the exhaust gas collector. This angular position has been proven to correspond to the maximum pressure inside the exhaust collector.

According to an embodiment, said bypass line is connecting the exhaust gas recirculation line to the exhaust gas line at a position upstream of an aftertreatment system. The aftertreatment system may comprise a diesel particle filter and/or a selective catalytic reduction system.

According to a second aspect, a vehicle is provided. The vehicle comprises an internal combustion engine system according to the first aspect described above.

A method for an internal combustion engine system is also provided. The system comprises an internal combustion engine, and a first turbine unit receiving exhaust gases from the internal combustion engine. The turbine unit has a compressor for compressing intake air and feeding said intake air by means of an air intake line to said internal combustion engine. The method comprises the steps of providing an exhaust gas recirculation line connecting said air intake line with an exhaust gas line of the internal combustion engine at a position upstream the first turbine unit, and providing a bypass line connecting the exhaust gas recirculation line to the exhaust gas line at a position downstream of the turbine unit, said bypass line having means for controlling the exhaust gas flow from the exhaust gas recirculation line to the exhaust gas line.

The method may further comprise providing at least one valve in said exhaust gas recirculation line for controlling the amount of recirculated exhaust gas The bypass line may be connected to the exhaust gas recirculation line at a position located downstream said at least one valve.

In an embodiment the bypass line is connected to the exhaust gas recirculation line at a position located between said at least one valve and the position where the exhaust gas recirculation line branches with the air intake line.

Further advantages and advantageous features of the invention are disclosed in the following description.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
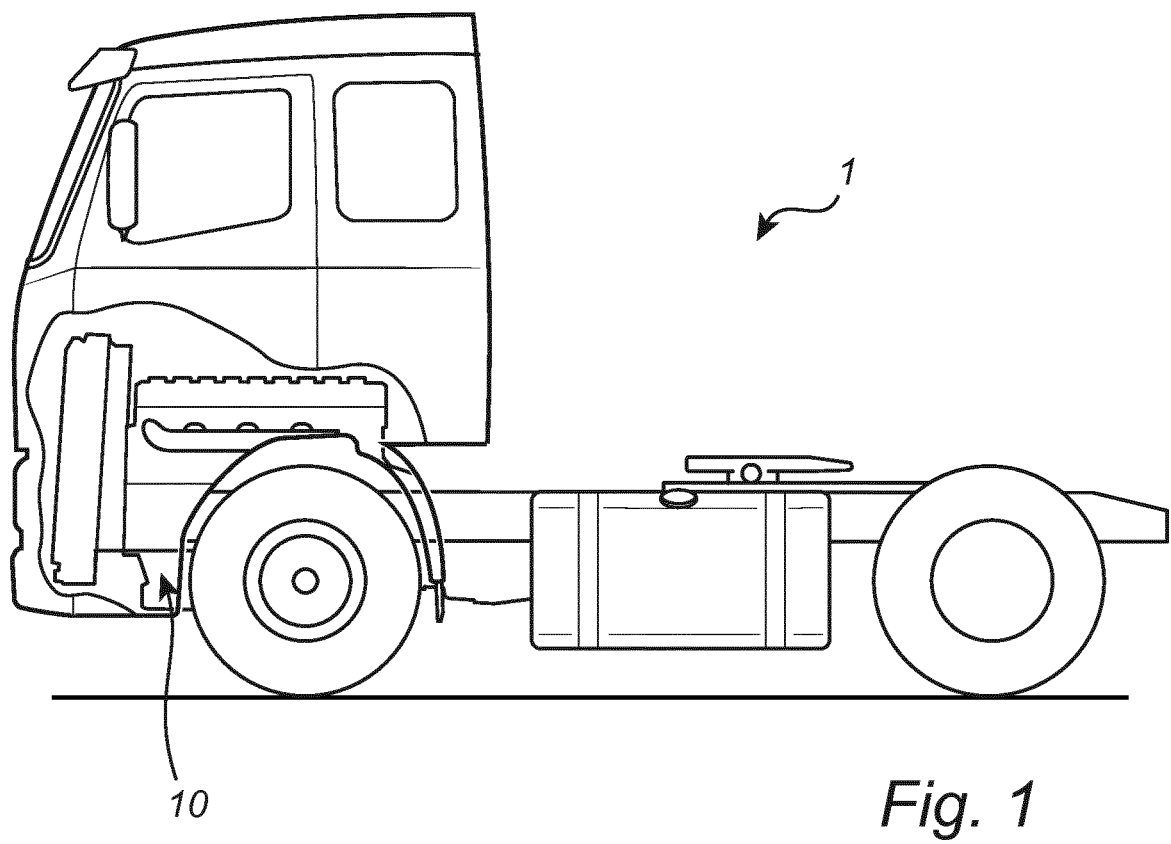
FIG. 1 is a side view of a vehicle according to an embodiment.

Starting with FIG. 1 a vehicle 1 is shown. The vehicle 1, which is illustrated as a truck, has an internal combustion engine 10 for driving the vehicle 1. As will be further explained below the internal combustion engine 10 of the vehicle 1 forms part of an internal combustion engine system according to various embodiments. The vehicle 1 may have additional propulsion units, such as electric drives etc. as long as it has at least one engine providing a flow of exhaust gases. Hence the vehicle 1 is, not exclusively a truck but may also represent various heavy duty vehicles such as buses, constructional equipment, etc.

Figure 2A:
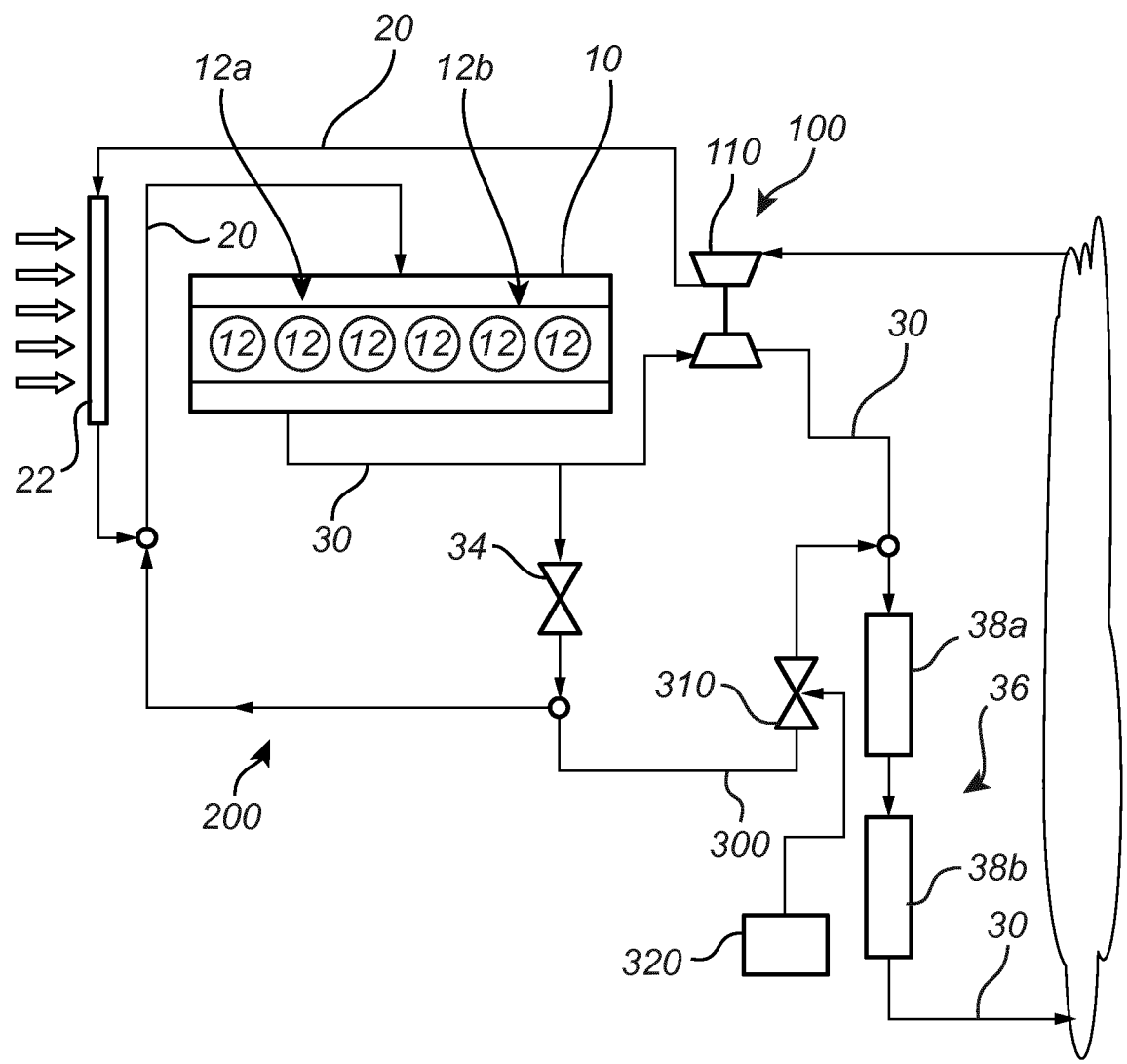
FIG. 2a is a schematic view of an internal combustion engine system according to an embodiment.
Figure 2B:
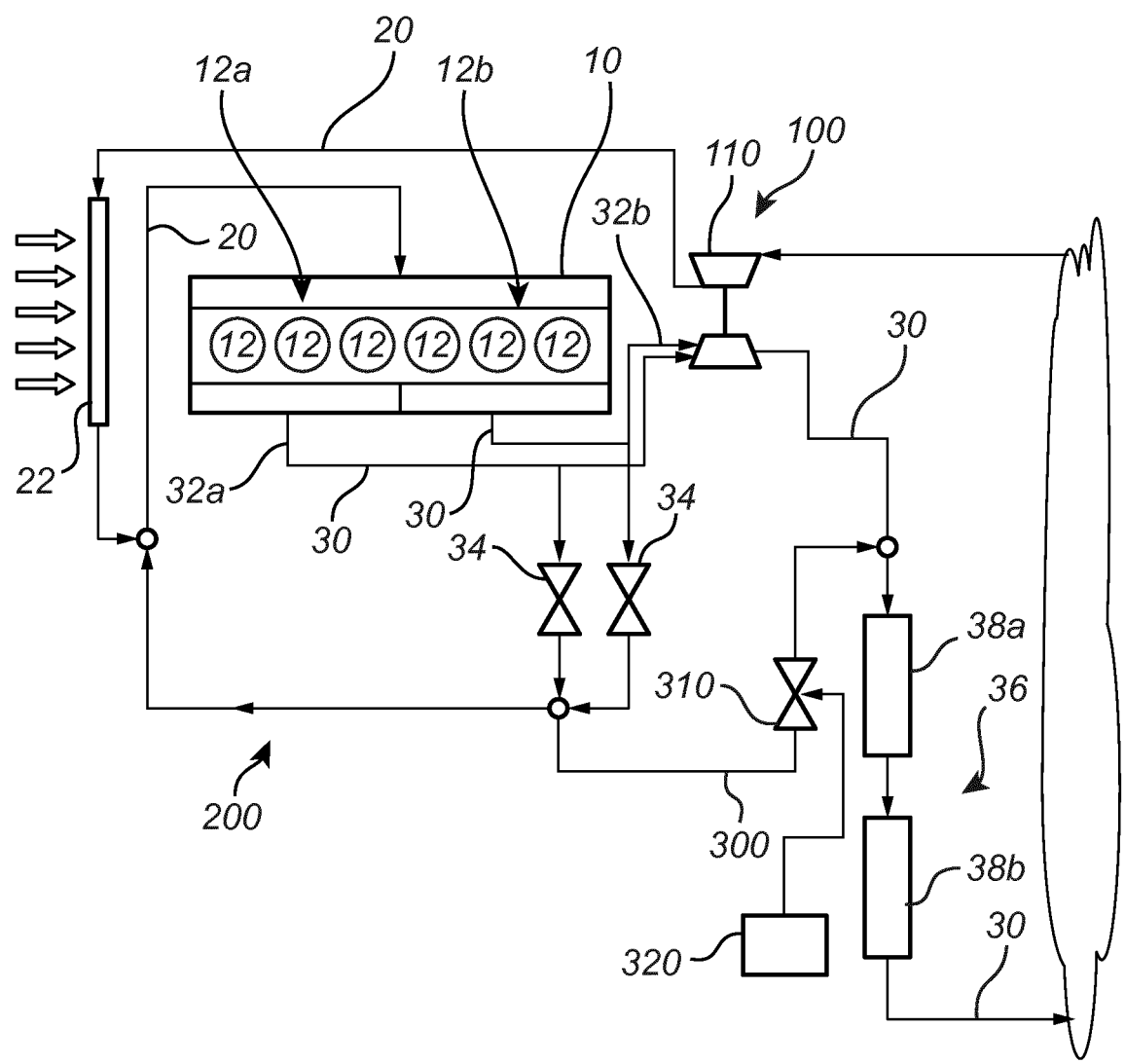
FIG. 2b is a schematic view of an internal combustion engine system according to an embodiment.

In FIGS. 2a and 2b examples of an internal combustion engine system is shown. The internal combustion engine system includes an engine 10 having a plurality of cylinders 12 operated to combust fuel, such as diesel or gasoline, whereby the motion of pistons reciprocating in the cylinders 12 is transmitted to a rotation movement of a crank shaft (not shown). The crank shaft is further coupled to a transmission (not shown) for providing a torque to driving elements (not shown). In case of a heavy vehicle, such as a truck, the driving elements are wheels; however the internal combustion engine system may also be used for other equipment such as construction equipment, marine applications, etc.

The internal combustion engine system further comprises a turbine unit 100; in FIG. 2 the turbine unit 100 is illustrated as a turbocharger. The turbocharger 100 receives exhaust gases from the internal combustion engine 10, wherein the flow of exhaust gases is used to drive a turbine of the turbocharger 100. A compressor 110 will rotate with the turbine for compressing intake air and the intake air is fed to the internal combustion engine 10 by means of an air intake line 20. The air intake line 20 extends from the outlet of the compressor 110 to the air intake of the internal combustion engine 10 preferably via a charge intercooler 22.

The internal combustion engine system further comprises an exhaust gas recirculation line 200 connecting the air intake line 20 with an exhaust gas line 30. The exhaust gas line 30 extends from the exhaust gas manifold forming the outlet of the cylinders 12, through the turbocharger 100 and an aftertreatment system 36, to the ambient. The aftertreatment system 36 preferably includes a diesel particle filter 38a and a selective catalytic reduction system 38b arranged downstream the turbocharger 100. Returning now to the exhaust gas recirculation line 200, it preferably extends between the air intake line 20, at a position before the intercooler 22 or between the intercooler 22 and the air inlet of the cylinders 12, and the exhaust gas line 30, at a position between the cylinders 12 and the turbocharger 100.

The internal combustion engine system further includes a bypass line 300 connecting the exhaust gas recirculation line 200 to the exhaust gas line 30 at a position downstream of the turbocharger 100, i.e. at a position between the turbocharger 100 and the aftertreatment system 36. The bypass line 300 comprises a valve 310 forming means for controlling the exhaust gas flow from the exhaust gas recirculation line 200 to the exhaust gas line 30.

As is shown in FIG. 2a a valve 34 is provided in the exhaust gas recirculation line 200 for controlling the amount of recirculated exhaust gas. Such valve is commonly known as an EGR valve. During operation of the internal combustion engine exhaust gases will flow from the cylinders 12 to the first turbine unit 100. Depending on the operation of the EGR valve 34 some amount of exhaust gases will be diverted to flow into the exhaust gas recirculation line 200. As is further shown in FIG. 2a, the bypass line 300 is connected to the exhaust gas recirculation line 200 at a position located downstream the valve 34, i.e. at a position located between the valve 34 and the position where the exhaust gas recirculation line 200 branches with the air intake line 20.

Due to the fact that the bypass line 300 connects to the exhaust gas recirculation line 200 downstream the EGR valve there will be no, or negligible disturbance of the pressure balance between the exhaust manifold volutes. Further, such solution allows for a much simpler design of the bypass valve 310 compared to prior art solutions in which the bypass line 300 connects upstream the EGR valve. As the EGR valve 34 is closed during, engine braking, which normally is the driving condition resulting in the highest pressure in the exhaust gas manifold, there ill be less intense constant pressure, as well as reduced pressure pulses, acting on the bypass valve 310.

Now turning to FIG. 2b another embodiment of an internal combustion engine system is shown. For this embodiment, during operation of the internal combustion engine exhaust gases will flow into a first branch 32a allowing exhaust gas to flow from a first set 12a of cylinders 12 to the first turbine unit 100, as well as into a second branch 32b allowing exhaust gas to flow from a second set 12b of cylinders 12 to the first turbine unit 100. Each branch 32a, 32b is provided with a valve 34 for controlling the amount of recirculated exhaust gas. The bypass line 300 is also in this embodiment connected to the exhaust gas recirculation line 200 at a position located downstream the EGR valves 34

The valve 310 of the bypass line 300 is preferably connected to a controller 320. The controller 320 is configured to control the operation of the valve 310, e.g. depending on the internal combustion engine load, internal combustion engine speed, and/or the lambda value of the internal combustion engine 10.

The bypass line 300, and the control of the flow through the bypass line 300 provides a number of advantages. Firstly, by allowing a bypass flow from the exhaust gas recirculation line 200 the temperature of the exhaust gas upstream the aftertreatment 36 may be increased. Secondly, it may be used to increase the maximum engine torque output by decreasing the exhaust gas manifold pressure, the exhaust gas manifold temperature, and the speed of the turbocharger 100. Thirdly, it allows the flow capacity of the turbocharger turbine to be better matched at low engine loads while still maintaining maximum achievable engine torque output in order to decrease fuel consumption of the internal combustion engine 10.

Figure 3:
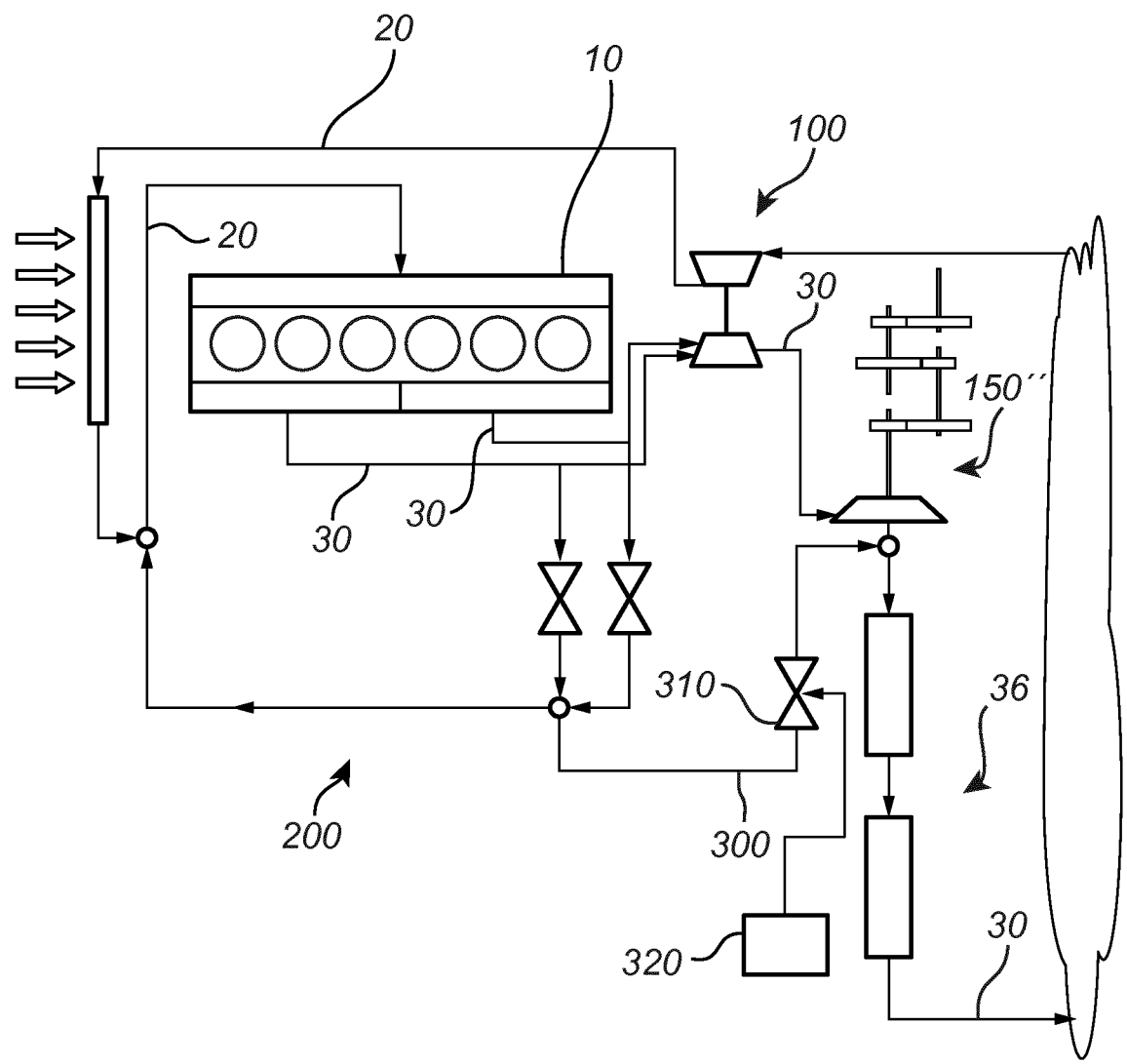
FIG. 3 is a schematic view of an internal combustion engine system according to an embodiment.

A further embodiment of an internal combustion engine system is shown in FIG. 3. The embodiment of FIG. 3 differs from the embodiment of FIGS. 2a-2b in that a turbocompound unit 150" is provided downstream the turbocharger 100. The turbocompound unit 150" thus receives exhaust gas flowing out from the turbocharger 100, which flow is used to drive a turbine of the turbocompound unit 150". Rotation of the turbine will be transmitted via one or more reduction gears to the crankshaft of the engine 10.

In this embodiment, having two turbine units 100, 150" arranged in series, the bypass line 300 is connecting the exhaust gas recirculation line 200 to the exhaust gas line 30 at a position downstream of the turbocompound unit 150", i.e. between the turbocompound unit 150" and the aftertreatment system 36.

Figure 4:
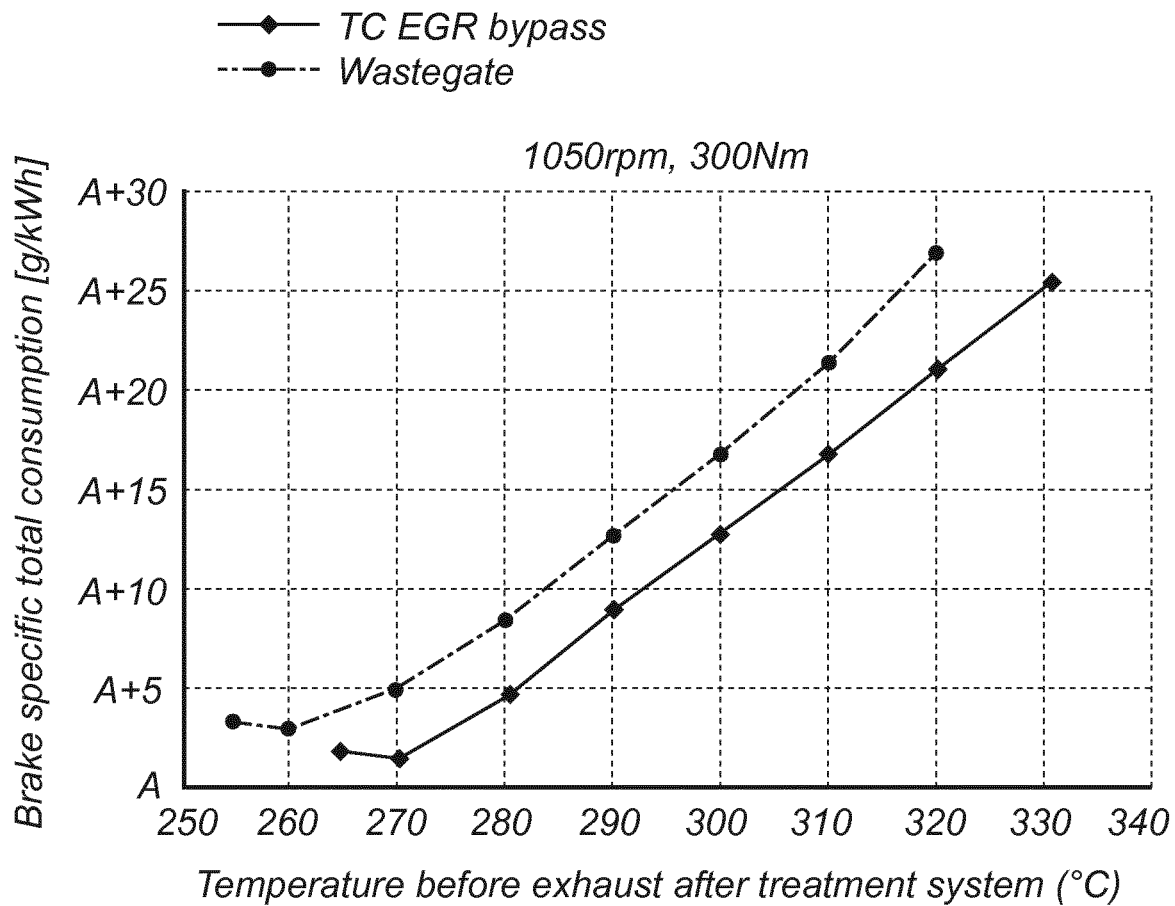
FIG. 4 is a diagram showing brake specific fuel consumption as a function of exhaust gas temperature for an internal combustion engine system according to an embodiment.

FIG. 4 shows a diagram of simulations of engine efficiency. In the diagram, the brake specific total consumption is plotted vs. exhaust gas temperature at a position between the turbocompound unit 150" and the aftertreatment system 36. The simulation was performed when the engine 10 was running at 1050 rpm, 300 Nm. The upper line relates to simulations of a prior art system using a wastegate to bypass the turbocharger 100, while the lower line relates to the internal combustion engine system shown in FIG. 3. As can be seen, for a specific exhaust gas temperature the brake specific total consumption is significantly lower using the internal combustion engine system described herein.

Figure 5:
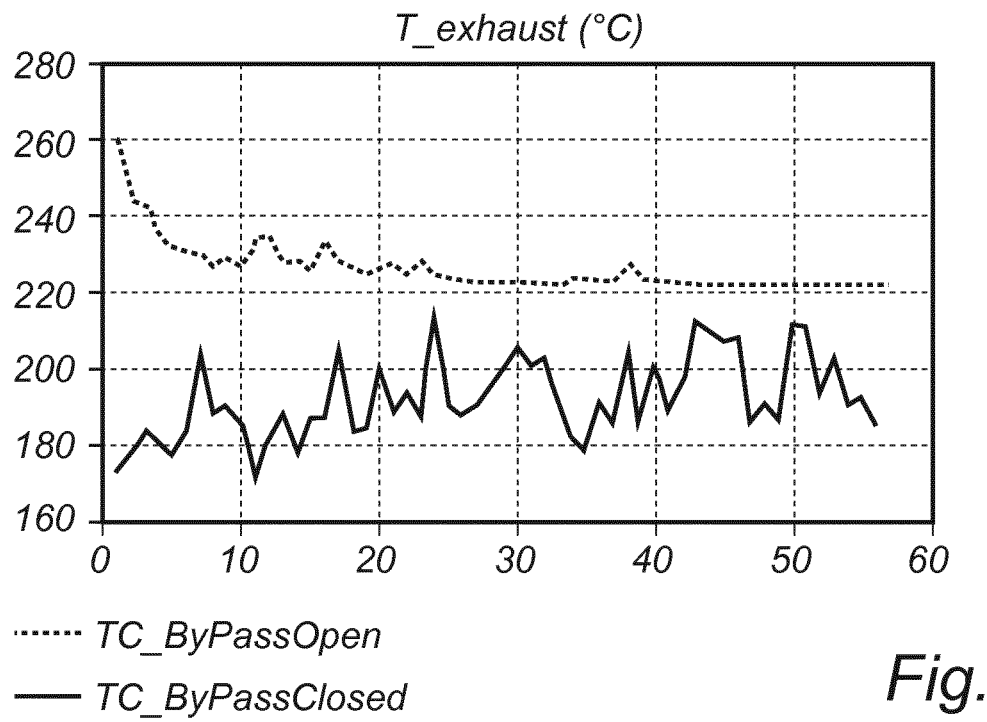
FIG. 5 is a diagram showing the exhaust gas temperature for an internal combustion engine system according to a embodiment.

FIG. 5 shows another diagram of the measurements of the exhaust gas temperature at a position between the turbocompound unit 150" and the aftertreatment system 36, for 57 different operating points at 1050 rpm. The lower line corresponds to the embodiment shown in FIG. 3 having the valve 310 in a closed position, while the upper line corresponds to the embodiment shown in FIG. 3 having the valve 310 in an open position, allowing bypass. As is evident, the temperature increases significantly when bypass is allowed.

Figure 6:
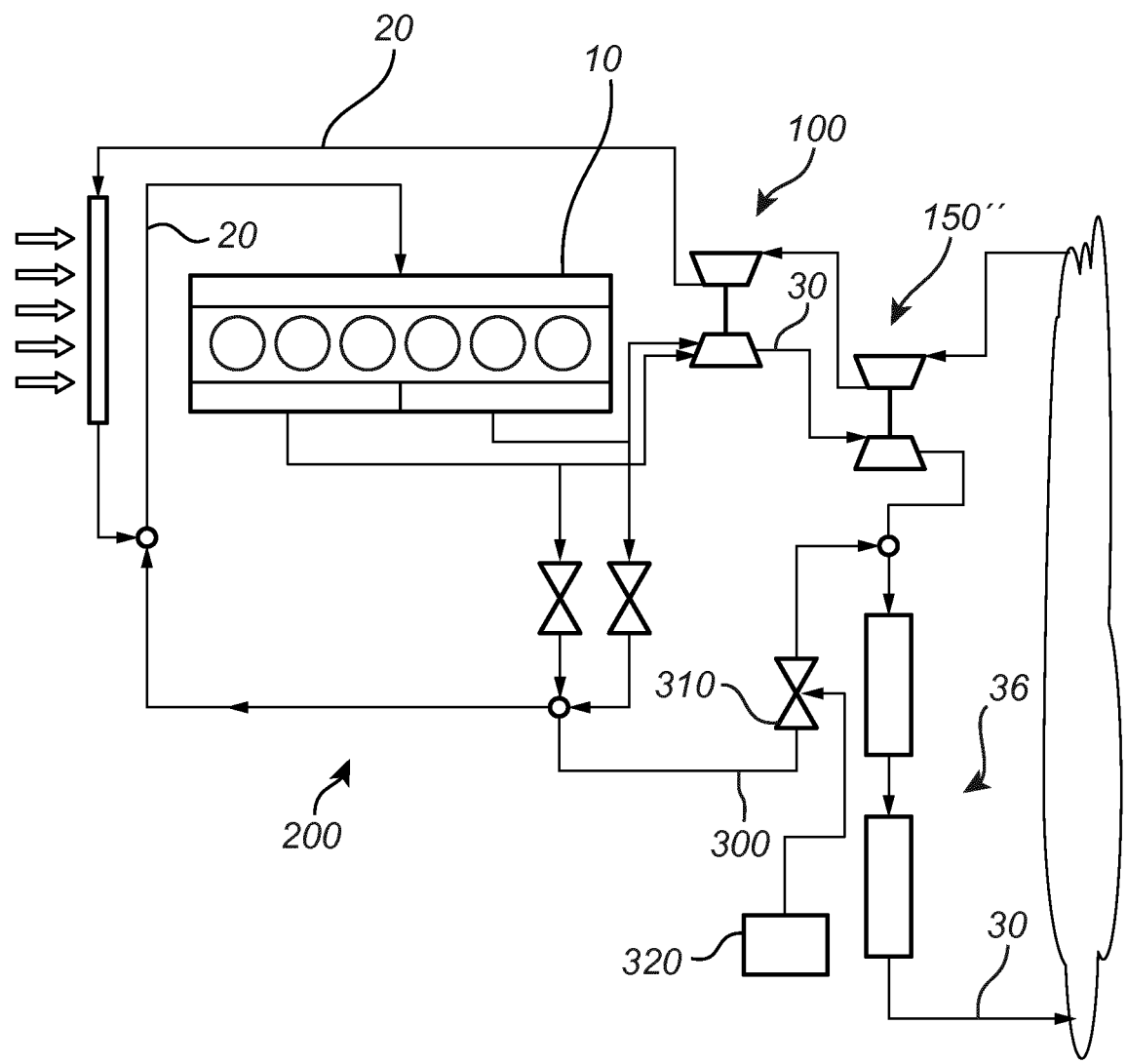
FIG. 6 is a schematic view of an internal combustion engine system according to an embodiment.

In FIG. 6 a yet further embodiment of an internal combustion engine system is shown. The embodiment is similar to the embodiment shown in FIG. 3, however the turbocompound unit 150" of FIG. 3 is here replaced by a turbocharger unit 150'. Hence, the embodiment shown in FIG. 6 is a two-stage turbocharger, and the bypass line 300 is connecting the exhaust gas recirculation line 200 to the exhaust gas line 30 at a position downstream of the second turbocharger 150'.

Figure 7:
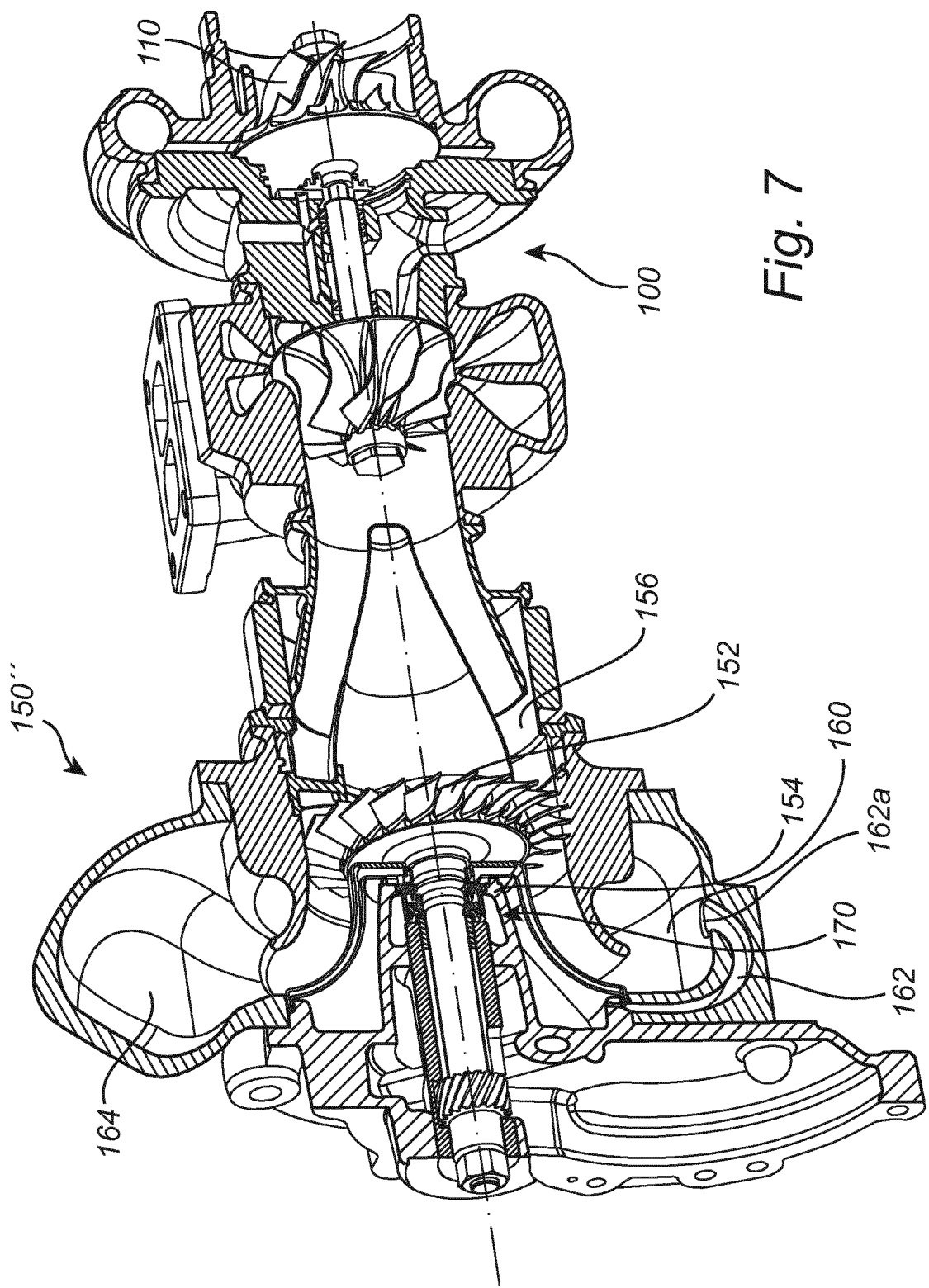
FIG. 7 is a cross-sectional view of an internal combustion engine system according to an embodiment.

Now turning to FIG. 7, a cross sectional view of a part of the internal combustion engine system of FIG. 3 is shown. FIG. 7 shows the first turbine unit 100, i.e. the turbocharger 100, and a downstream turbocompound unit 150".

Exhaust gas leaving an outlet of the turbocharger 100 is directed to an axial-flow turbine, wheel 152 of the turbocompound unit 150". The exhaust gas exhibits a pressure drop and temperature decrease, which is converted by the turbine wheel 152 into kinetic energy that is supplied to the engine crankshaft.

The turbocompound unit 100 comprises a bearing housing 154, an exhaust diffuser duct 156 for conveying exhaust gas to an annular exhaust collector 160, and the turbine wheel 152 with blades positioned in the diffuser duct 156. A shaft, carrying the turbine wheel 152, is supported in the bearing housing 154 by means of bearings. By arranging the bypass line 300 such that it connects the exhaust gas recirculation line 200 to the exhaust gas collector 160 an efficient seal of the bearing housing 154 may be accomplished as will be described below.

The turbocompound unit 150" comprises an oil sealing system with a sealing arrangement 170 positioned in the vicinity of the turbine wheel 152 for preventing lubrication oil from escaping from the inside of the bearing housing 154 along the shaft into the exhaust gas stream, which passes axially past the turbine wheel 152. The turbine wheel 152 rotates with a significant speed, for example up to about 50 000 rpm, thereby generating a reduced exhaust gas pressure at a radially inner region of the turbine wheel 152 compared to the exhaust gas pressure at a radially outer region of the turbine wheel 152. This difference in exhaust gas pressure is caused partly by centrifugal forces acting on the exhaust gas located close the turbine wheel 152. At the same time, the oil mist pressure at the inner side of the housing 154 varies with oil pump operation etc., and is during certain operating conditions higher than the exhaust gas pressure at the inner regrow of the turbine wheel 152. This pressure difference may generate an oil leakage out from the inside of the housing 154 into the exhaust gas stream. The leaked oil then mix with the exhaust gas causing increased emissions, increased lubrication oil consumption, and/or poisoning of the exhaust aftertreatment system.

The oil sealing system comprises a buffer gas duct 162 that is arranged to supply exhaust gas from the exhaust collector 160 to the sealing arrangement 170 for pressurizing the sealing arrangement 170. A pressurized sealing arrangement 170 that has a pressure above the oil mist pressure at the inner side of the housing 154 effectively prevents any oil leakage along the shaft.

The exhaust gas collector 160 is in fluid communication with the buffer gas duct 162 which leads into the exhaust gas collector 160. The buffer gas duct 162 is thereby arranged to supply exhaust gas from the exhaust collector 160 to the sealing arrangement 170 positioned in the vicinity of the turbine wheel 152 of the turbocompound unit 150" for preventing oil from escaping from the bearing housing 154 to the diffuser duct 156 of the turbocompound unit 150".

As can be seen in FIG. 7 the exhaust gas collector 160 forms an annular flow path fir the exhaust gases. The buffer gas duct 162 extends from a buffer gas inlet 162a arranged at the outer periphery of the exhaust gas collector 160. Preferably, the buffer gas inlet 162a is arranged at a circumferential position of 170°-190° measured from the circumferential position of a center of an exhaust outlet 144 of the exhaust gas collector 160.

The buffer gas duct 162 may e.g. extend from the inlet 162a and through a channel formed in the side wall of the exhaust collector 160. The buffer gas duct 162 may continue through a cavity such that pressurized exhaust gas is supplied to the sealing arrangement 170.

Measuring results and tests have shown that the highest pressure downstream the turbine wheel 152 inside the exhaust collector is approximately 180° from the exhaust outlet 164, i.e. at the bottom position of the exhaust collector 160. During operation it has been proven that the static pressure in this area is always higher than the static pressure inside the bearing housing 154, as well as than the pressure behind the turbine wheel 152. By introducing bypass flow of exhaust gases into the collector 160, an improved sealing of the bearing housing 154 is achieved.

Figure 8:
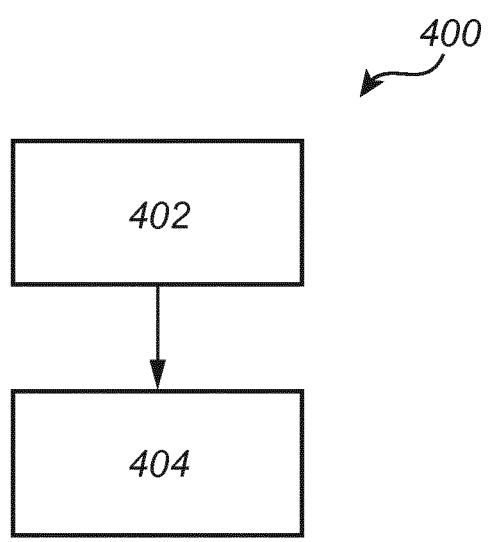
FIG. 8 is a schematic view of a method according to an embodiment.

A method 400 for an internal combustion engine system is schematically shown in FIG. 8. In accordance with the description above the system comprises an internal combustion engine 10, and a first turbine unit 100 receiving exhaust gases from the internal combustion engine 10. The turbine unit 100 has a compressor 110 for compressing intake air and feeding said intake air by means of an air intake line 20 to said internal combustion engine 10, and may preferably be realized as a turbocharger 100. The method 400 comprises a first step 402 of providing an exhaust gas recirculation line 200 connecting the air intake line 20 with an exhaust gas line 30 of the internal combustion engine 10 at a position upstream the first turbine unit 100. The method further comprises a step 404 of providing a bypass line 300 connecting the exhaust gas recirculation line 200 to the exhaust gas line 30 at a position downstream of the turbine unit 100, said bypass line 300 having means 310 for controlling the exhaust gas flow from the exhaust gas recirculation line 200 to the exhaust gas line 30.

It is to be understood that the present invention is not limited to the embodiments described above and illustrated in the drawings; rather, the skilled person will recognize that many changes and modifications may be made within the scope of the appended claims.

The invention claimed is:

1. An internal combustion engine system,
comprising: an internal combustion engine,
a first turbine unit receiving exhaust gases from the internal combustion engine, the turbine unit having a compressor for compressing intake air and feeding the intake air by means of an air intake line to the internal combustion engine,
an exhaust gas recirculation line connecting the air intake line with an exhaust gas line of the internal combustion engine at a position upstream the first turbine unit, the exhaust gas line having at least one branch, and
a bypass line connecting the exhaust gas recirculation line to the exhaust gas line at a position downstream of the turbine unit,
at least one valve is provided in the exhaust gas recirculation line for each branch of the exhaust gas line for controlling the amount of recirculated exhaust gas, wherein the bypass line is connected to the exhaust gas recirculation line at a position located downstream the at least one valve between the at least one valve and a position where the exhaust gas recirculation line connects to the air intake line,
wherein the bypass line comprises means configured to control the exhaust gas flow from the exhaust gas recirculation line to the exhaust gas line in order to increase temperature of the exhaust gas downstream of the turbine unit and upstream of an aftertreatment system of the engine, the aftertreatment system including a diesel particle filter and a selective catalytic reduction system,
wherein the bypass line is connected to the exhaust gas line at a position located upstream of both of the diesel particle filter and the selective catalytic reduction system of the aftertreatment system.

2. The internal combustion engine system according to claim 1, wherein the means configured to control the exhaust gas flow from the exhaust gas recirculation line to the exhaust gas line is a bypass valve.

3. The internal combustion engine system according to claim 2, further comprising a controller configured to control the operation of the bypass valve depending on the internal combustion engine load, internal combustion engine speed, turbine speed, and/or the lambda value of the internal combustion engine.

4. The internal combustion engine system according to claim 1, wherein the exhaust gas line comprises a first branch allowing exhaust gas to flow from a first set of cylinders to the first turbine unit, and a second branch allowing exhaust gas to flow from a second set of cylinders to the first turbine unit, and wherein each one of the branches is in communication with the at least one valve provided in the exhaust gas recirculation line.

5. The internal combustion engine system according to claim 1, wherein the first turbine unit is a turbocharger unit.

6. The internal combustion engine system according to claim 1, further comprising a second turbine unit arranged downstream of the first turbine unit such that the second turbine unit receives exhaust gas flowing out from the first turbine unit, wherein the bypass line is connecting the exhaust gas recirculation line to the exhaust gas line at a position downstream of the second turbine unit.

7. The internal combustion engine system according to claim 6, wherein the second turbine unit is a turbocharger unit.

8. The internal combustion engine system according to claim 6, wherein the second turbine unit is a turbocompound unit.

9. The internal combustion engine system according to claim 8, wherein the bypass line is connecting the exhaust gas recirculation line to an exhaust gas collector of the turbocompound unit.

10. The internal combustion engine system according to claim 9, wherein the exhaust gas collector is in fluid communication with a buffer gas duct which leads into the exhaust gas collector, whereby the buffer gas duct is arranged to supply exhaust gas from an exhaust collector seal positioned in the vicinity of a turbine wheel of the turbocompound unit for preventing oil from escaping from an associated bearing housing to a diffuser duct of the turbocompound unit.

11. The internal combustion engine system according to claim 9, wherein the exhaust gas collector forms an annular flow path for the exhaust gases.

12. The internal combustion engine system according to claim 11, wherein a buffer gas duct extends from a buffer gas inlet arranged at the outer periphery of the exhaust collector.

13. The internal combustion engine system according to claim 12, wherein the buffer gas inlet is arranged at a circumferential position of 170°-190° measured from the circumferential position of a center of an exhaust outlet of the exhaust gas collector.

14. A vehicle comprising an internal combustion engine system according to claim 1.

15. A method for an internal combustion engine system, the system comprising an internal combustion engine, and a first turbine unit receiving exhaust gases from the internal combustion engine, the turbine unit having a compressor for compressing intake air and feeding the intake air by means of an air intake line to the internal combustion engine, comprising: providing an exhaust gas recirculation line connecting the an intake line with an exhaust gas line of the internal combustion engine at a position, upstream the first turbine unit, the exhaust gas line having at least one branch, providing: a bypass line connecting the exhaust gas recirculation line to the exhaust gas line at a position downstream of the turbine unit and at a position upstream of both of a diesel particle filter and a selective catalytic reduction system of an aftertreatment system, a bypass valve controlling the exhaust gas flow from the exhaust gas recirculation line to the exhaust gas line in order to increase temperature of the exhaust gas downstream of the turbine unit and upstream of the aftertreatment system of the engine, and providing at least one valve in the exhaust gas recirculation for each branch of the exhaust gas line for controlling the amount of recirculated exhaust gas, wherein the bypass line is connected to the exhaust as recirculation line at a position located downstream the at least one valve between the at least one valve and a position where the exhaust gas recirculation line connects to the air intake line.

* * * * *